United States Patent [19]
Colineau et al.

[11] Patent Number: 5,420,734
[45] Date of Patent: May 30, 1995

[54] MULTITRACK READ HEAD HAVING A MATRIX NETWORK OF ELEMENTARY MAGNETO-RESISTIVE HEADS

[75] Inventors: Joseph Colineau, Bures S/Yvette; Jean-Marc Coutellier, Maurepas, both of France

[73] Assignee: Thomson-CSF, Puteaux, France

[21] Appl. No.: 47,357

[22] Filed: Apr. 19, 1993

Related U.S. Application Data

[63] Continuation of Ser. No. 631,245, Dec. 20, 1990, abandoned.

[30] Foreign Application Priority Data

Dec. 22, 1989 [FR] France ................. 89 17082

[51] Int. Cl.$^6$ ............ G11B 5/39; G11B 5/29
[52] U.S. Cl. ................ 360/113; 360/121
[58] Field of Search ................. 360/113, 121

[56] References Cited

U.S. PATENT DOCUMENTS

| | | | |
|---|---|---|---|
| 3,668,670 | 6/1972 | Anderson | 360/112 |
| 3,932,731 | 1/1976 | Moore, Jr. | 235/61.11 D |
| 3,987,485 | 10/1976 | Sugaya et al. | 360/113 |
| 4,040,113 | 8/1977 | Gorter | 360/113 |
| 4,047,236 | 9/1977 | Lee | 360/113 |
| 4,052,748 | 10/1977 | Kuijk | 360/113 |
| 4,065,797 | 12/1977 | Nomura et al. | 360/113 |
| 4,142,218 | 2/1979 | Gorter | 360/113 |
| 4,197,987 | 4/1980 | Lazzari | 360/113 |
| 4,275,428 | 6/1981 | Lehureau | 360/113 |
| 4,303,956 | 12/1981 | Kobubu et al. | 360/123 |
| 4,356,523 | 10/1982 | Yeh | 360/113 |
| 4,439,671 | 3/1984 | Helle | 360/113 |
| 4,673,998 | 6/1987 | Souda et al. | 360/113 |
| 4,691,259 | 9/1987 | Imakoshi et al. | 360/113 |
| 4,717,979 | 1/1988 | Washisu | 360/113 |
| 4,901,177 | 2/1990 | Lazzari | 360/113 |
| 5,107,385 | 4/1992 | Kelley | 360/113 |

FOREIGN PATENT DOCUMENTS 7510306 11/1975 Netherlands.

OTHER PUBLICATIONS

Patent Abstracts of Japan, vol. 7, No. 64 (P-183) (1209), Mar. 17, 1983, & JP-A-57 208624, Dec. 21, 1982, N. Tokuyado, "Magneto-Resistance Effect Head".
Patent Abstracts of Japan, vol. 4, No. 31 (P-2) (513) Mar. 18, 1980, & JP-A-55-004738, Jan. 14, 1980, T. Ozeki; "Magnetoresistance Effect Type Magnetic Head".
Patent Abstracts of Japan, vol. 10, No. 358 (P-522) (2415), Dec. 2, 1986, & JP-A-61-153897, Jul. 12, 1986, H. Tanaka, "Solid-State Magnetic Memory Element And Its Recording And Reproducing Method".
Patent Abstract of Japan, vol. 1, No. 155 (E-073), Dec. 12, 1977, & JP-A-52 098510, Aug. 18, 1977, S. Nakamura, "Multichannel Magnetic Head".
Patent Abstracts of Japan, vol. 3, No. 41 (E-103), Apr. 10, 1979, & JP-A-54 021315, Feb. 17, 1979, T. Kobayashi, "Magnetic Recorder".

*Primary Examiner*—Stuart S. Levy
*Assistant Examiner*—Craig A. Renner
*Attorney, Agent, or Firm*—Oblon, Spivak, McClelland, Maier & Neustadt

[57] ABSTRACT

The read head according to the invention comprises a matrix network of elementary heads whose magnetic circuit comprises a magneto-resistive element. The different elements are electrically connected in columns and traversed by a current. Head selection lines enable the active line of heads to be selected. The read signal is collected on each column.

4 Claims, 3 Drawing Sheets

FIG_1
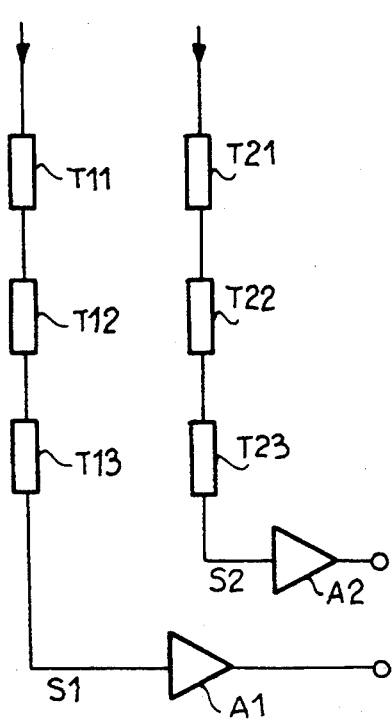
FIG_2
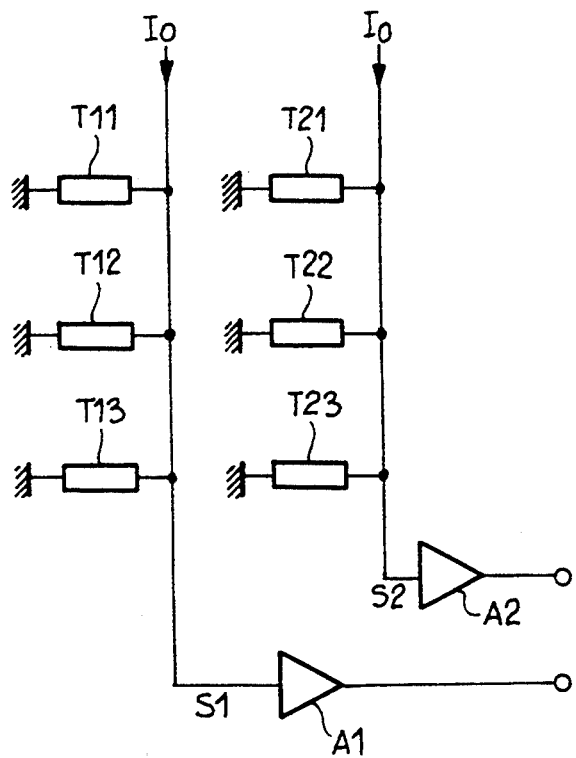
FIG_3
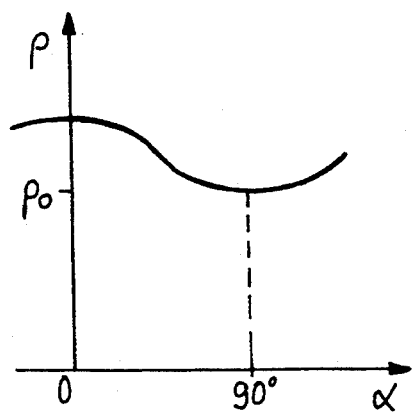
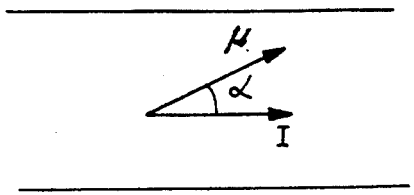

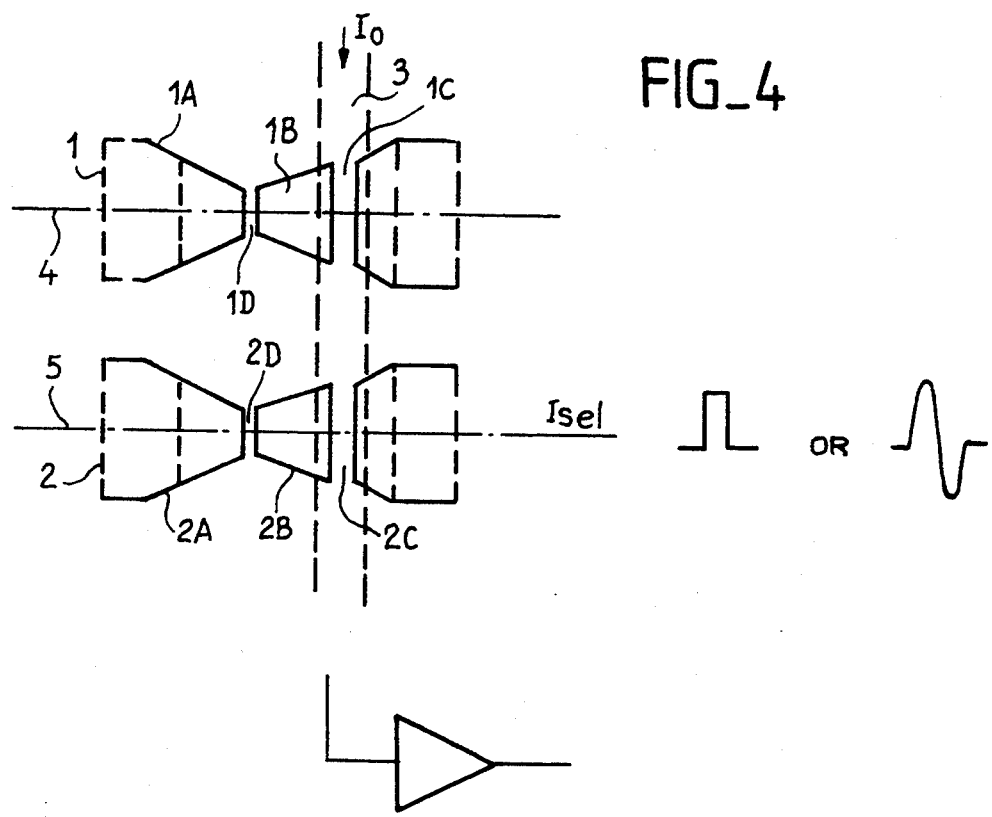
FIG_4
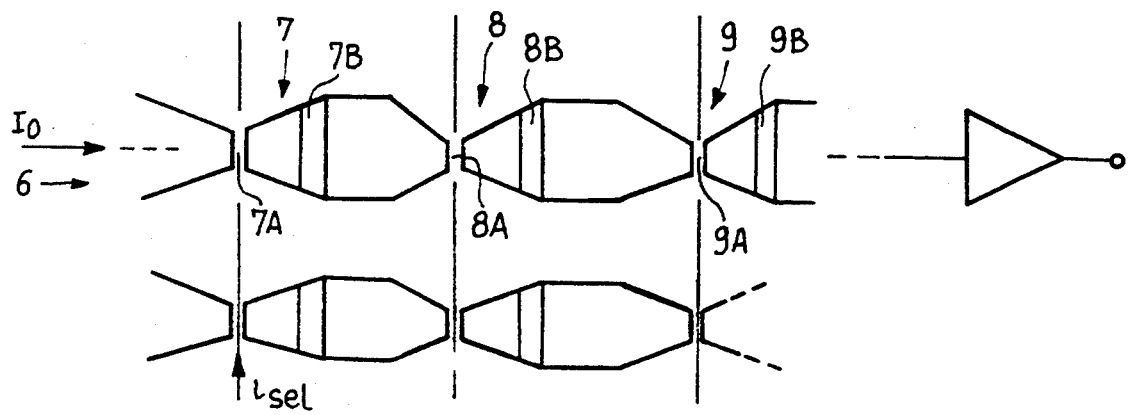
FIG_5

FIG_6
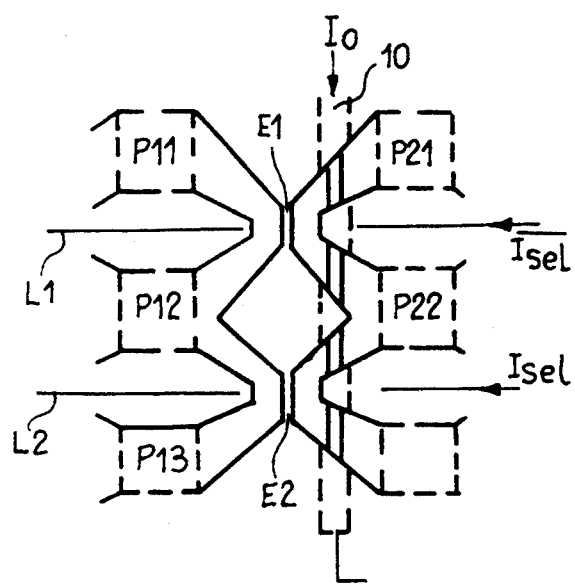
FIG_7
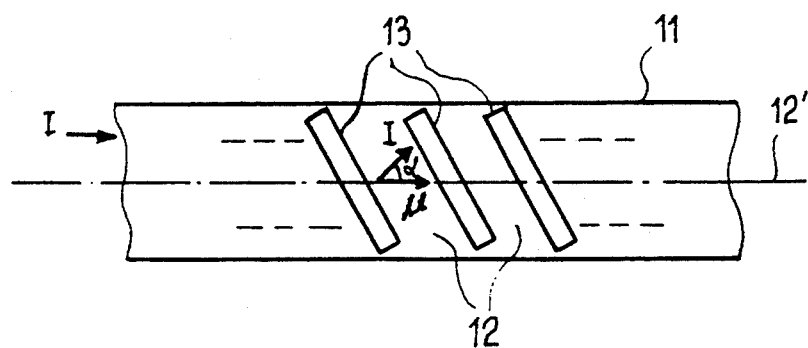

MULTITRACK READ HEAD HAVING A MATRIX NETWORK OF ELEMENTARY MAGNETO-RESISTIVE HEADS

This application is a continuation of application Ser. No. 07/631,245, filed on Dec. 20, 1990, now abandoned.

BACKGROUND OF THE INVENTION

The invention concerns a multitrack read head.

Multiplexed multitrack magnetic write heads are used to record a large number of tracks (about 1000) in magnetographic printers. A write head is also known after French Patent Application 88 05592. These heads are controlled by matrix addressing, which enables the information to be recorded to be sent for example to successive columns of elementary heads, and to activate all the heads involved in a given line by suitable excitation of the line selection connections.

However, the read heads which enable reading of the multitrack magnetic media recorded using these write heads are of magneto-optical type, difficult to integrate into a small volume.

SUMMARY OF THE INVENTION

The object of the present invention is a multitrack read head which can integrate a great number of elementary heads in a small volume, and whose performance is good in varied conditions of use.

The multitrack read head according to the invention comprises a matrix network of elementary heads of magneto-resistive type, the signals read by these elementary heads being collected on the different columns of the matrix of heads, head line selection signals being sent to the different lines, or vice versa.

BRIEF DESCRIPTION OF THE DRAWINGS

The present invention will be better understood on reading the description of several modes of embodiment, taken as non-restrictive examples and illustrated by the appended drawings, of which:

FIGS. 1 and 2 are simplified diagrams of connection of elementary heads of a read head according to the invention, FIG. 3 is a diagram illustrating the variation of resistivity in a magnetic material as a function of the angle formed between the direction of the current crossing it and the direction of its magnetization, FIGS. 4 to 7 are simplified plan views of different modes of embodiment of read heads according to the invention.

DESCRIPTION OF THE PREFERRED EMBODIMENTS

The invention is described below with reference to a multitrack read head for magnetic tapes, but it is clear that it can cooperate with other magnetic media using multitrack recording. Moreover, the preferred modes of embodiment of the invention concern compact heads (to read several tens or hundreds of tracks on magnetic tapes a few millimeters or a few centimeters wide), but it is clear that the invention can also be used for much larger read heads reading wide magnetic media.

The read head of the invention has a matrix structure, which means that it comprises several elementary heads arranged in lines and columns. The lines are not necessarily perpendicular to the columns. The denominations line and column are arbitrary.

In the head of the invention, the elementary heads operate using the magneto-resistive effect, i.e. they comprise a material whose resistivity varies depending on the magnetic field to which they are subjected. To make use of the variation in the resistivity of these elementary heads, and thus obtain a signal whose amplitude is a function of the magnetic field influencing them, they are electrically connected in lines and columns and an electric current is made to go through them, the lines of course being electrically insulated from the columns. This electric current is sent to the magneto-resistive elements of the different columns of elementary heads, the selection of one or more heads of a given line being made by applying a selection voltage or current to the corresponding line.

In the diagrams of FIGS. 1 and 2 are represented the magneto-resistive elements of some of the elementary heads of a read head according to the invention: the magneto-resistive elements of the first three heads of the first two columns have been shown: T11, T12 and T13 for the first column, and T21, T22, T23 for the second column.

According to the mode of embodiment in FIG. 1, in each column the elements T11, T12, T13 ... and T21, T22, T23 ... are connected in series, and each column receives a voltage $V_o$.

According to the mode of embodiment in FIG. 2, in each column the elements T11 etc. are in parallel, and each column receives a current $I_o$.

For these two modes of embodiment, the output from each column S1, S2 is connected to a preamplifier A1, A2, ...

In the mode of embodiment of FIG. 1, if R is the resistance at rest of each of the elements T11, ... T23, Re the input impedance of the preamplifiers A1, A2, ..., n the number of elements in each column, the variation $\Delta v$ in voltage at input to the preamplifiers, for a variation $\Delta R$ of an element of a column, equals:

$$\Delta v = I_o \Delta R \frac{Re}{nR + Re} = \frac{I_o}{n} \cdot \frac{\Delta R}{R} \cdot Req$$

where $Req = \frac{nR \cdot Re}{nR + Re}$

This variation is therefore proportional to the measuring current $I_o$ and to the magneto-resistive effect $\Delta R/R$ of the material of variable resistivity.

Moreover, if the input impedance Re of the preamplifiers is chosen to be sufficiently large in front of n.R, we obtain:

$$\Delta v = I_o \Delta R,$$

i.e. the signal level at input to a preamplifier is practically the same as that which would be supplied by a device with only one elementary head in the column.

It can be demonstrated that the dominant noise component is the Schottky noise, a function of the measuring current. The signal/noise ratio (S/N) is then expressed by the relation:

$$(S/N) = 1/n \cdot \frac{\Delta R}{R} \sqrt{\frac{I_o}{2qB}}$$

q being the charge of the electron and B the useful pass band.

It can be seen that this ratio varies with the square root of $I_o$. $I_o$ will therefore be chosen to be as great as possible, taking into account the thermal dissipation of the elements. But the ratio also varies as $1/n$, and n must therefore be kept within reasonable limits (a few tens, for example) to assure a reasonable S/N ratio.

FIG. 3 shows the curve of the variation in resistivity $\rho$ of a magnetic material as a function of the angle $\alpha$ between the direction of the current I crossing this material and the direction of its magnetization $\mu$. The equation of this curve is of the form:

$$\rho = \rho_o \left(1 + \frac{\Delta \rho}{\rho} \cos^2 \alpha \right)$$

$\rho_o$ being the resistivity at rest of this material.

For a material such as Permalloy (90% Ni, 10% Fe), $\Delta\rho/\rho_o$ can reach 5%.

In a multitrack read head, not only the S/N ratio is important but also the crosstalk. To have access in succession to the information gathered by each of the elementary heads, a multiplexing device must be provided. For this purpose, two different processes can be used: one using the non-linearity of the heads as a function of the angle of magnetization, and the other by enabling and disabling of the heads using control currents.

We shall first describe modes of embodiment using multiplexing by control of the angle of magnetization of the heads. In FIGS. 4 and 5 are represented two such modes of embodiment. In FIG. 4 are represented two elementary heads 1, 2 in the same column. Each head 1, 2 comprises essentially a first normal pole 1A, 2A and a second pole 1B, 2B in which has been inserted a magneto-resistive element 1C, 2C. In the present case, all the magneto-resistive elements 1C, 2C, . . . of the same column is made of a continuous conductor 3 of a magneto-resistive material. According to a variant mode, not shown, the different elements 1C, 2C, . . . are made in separate sections and connected by a layer of material of high conductivity of approximately the same size as the conductor 3.

The poles are preferably made with planar technology, for example as described in French Patent Application 88 05592. The magneto-resistive elements, or the conductor 3, are manufactured in such a way as to give them an anisotropy perpendicular to the flux lines generated by the magnetic tape to be read, during their deposition or by a later phase of treatment, or thanks to an antiferromagnetic coupling layer. Thus, in the absence of any external influence, the coupling between the tape and the magneto-resistive material is minimal.

Conductors 4, 5 approximately perpendicular to or slightly oblique with respect to the columns (3) of magneto-resistive elements, and passing close to the air gaps 1D, 2D, . . . of the elementary heads, constitute selection lines of elementary heads.

The operation of the head described above is as follows. To activate the magneto-resistive elements of a line, for example the line corresponding to the conductor 4, a current is injected into this conductor. The magnetic field thus created is insufficient to erase the magnetic tape in contact with the head, but orients the magnetization of the magneto-resistive elements intersected by this conductor at 45° from the direction of the line selection connectors. Thanks to this change in orientation, the sensitivity of the magneto-resistive elements becomes maximum and the variation in resistance produced by the field of the tape generates a signal which can be measured at the output from the corresponding column.

Successive excitation of all the multitrack head selection lines thus produces, at the output from each column, a signal representing successively the magnetization of the tape read by each of the elementary heads of a column.

The selection signal can be a current pulse ($I_{sel}$) or an alternating current successively taking the values $+I_{sel}$ and $-I_{sel}$ during one or more periods.

According to the mode of embodiment represented in FIG. 5, in each line of elementary heads, for example line 6, partially shown in FIG. 5, the poles of the different elementary heads 7, 8, 9 . . . are connected in series, a non-magnetic conducting material filling the air gaps 7A, 8A, 9A, . . . of these heads. The magneto-resistive elements 7B, 8B, 9B, . . . of the heads 7, 8, 9 . . . are inserted into one of the two pole pieces of each head. In each line, the pole pieces and the material in the gap serve as electric conductors joining the magneto-resistive elements.

According to a variant, not shown, magneto-resistive elements are inserted into each of the pole pieces of each elementary head.

According to another variant, not shown, the poles of the elementary heads are themselves of a magneto-resistive material. In this case, the poles are in contact with the magnetic tape to be read only in the vicinity of the air gap.

In all the modes of embodiment, the characteristics of the magnetic circuit of the elementary heads (shape and dimensions of the poles, permeance of the magneto-resistive element, etc.) are such that the selection current is able to orient the magnetization of the magneto-resistive element in a suitable way, without generating a field of too high amplitude in the air gaps of the heads.

As mentioned above, the multiplexing of the elementary heads can be performed by controlling the permeance of these heads. The control (or modulation) of the permeance of magnetic heads is a known technique, in particular to form read heads operating in accordance with the "flux-gate" principle. In addition, according to French Patent Applications 89 08015 and 89 09887, solutions are known to the problem of the control of multitrack write heads, in particular processes for controlling the heads by pole saturation.

In FIG. 6 is shown a mode of embodiment of a read head operating by modulation of the permeance of the magnetic circuits of its elementary heads. The read head comprises pole chips with an approximately square surface, arranged in rows and columns, the rows of which can be perpendicular or approximately perpendicular to the columns. The chips are referenced respectively P11, P12, P13, . . . for the first column, P21, P22, P23, . . . for the second column, etc. In each column, each chip is connected to each adjacent chip by two "bridges" of magnetic material, each approximately V-shaped with a slightly flattened point, the two Vs always connecting two adjacent chips having their points facing in opposite directions. The shape and size of the Vs are such that between two adjacent columns, the facing points of the Vs each time define a gap, which is the gap of the elementary magnetic heads. In each column of chips, magneto-resistive elements are inserted in the two branches of the Vs of these chips on the same side of this column, for example on the left as represented in FIG. 6, these elements forming part of the same band 10 of magneto-resistive material, or being separate and connected, in columns, by material of good electrical conductivity, as for FIG. 4. Each column of magneto-resistive elements is traversed by a current $I_o$, as for FIG. 4. Line conductors L1, L2 . . . , approximately perpendicular to the columns of chips, pass at each gap E1, E2, . . . The current $I_{sel}$ sent into each of these line conductors is of sufficient amplitude to saturate the corresponding poles and therefore inhibit the corresponding lines of elementary heads. Only the line n of heads whose corresponding line conductor Ln is not traversed by a current $I_{sel}$ transfers the flux of the tape read to the corresponding magneto-resistive element, and the corresponding information can then be gathered on each of the columns. The column required must simply be activated (or all the others inhibited).

In FIG. 7 is represented a part 11 of a magnetic circuit enabling the direction of passage of the current through a magneto-resistive material 12 to be suitably oriented. This material 12 is in the form of a narrow rectangular band in which are inserted at least two cores 13 of very good electrically conducting material of the same thickness as that of the band. These cores 13 are approximately rectangular in shape. They are about as long as the width of the band 12, and their width is about 1/5 to 1/10 of their length. These cores 13 are arranged obliquely with respect to the perpendicular to the axis 12' of the band 12, at a distance from each other of less than the width of the band 12. The angle formed between the longitudinal axis of the cores 13 and the axis 12' is for example about 45°. Thus, a current I passing in the band 12 tends to cross the elements of the band between cores 13 which are consecutive obliquely to the axis 12', which gives an angle between the remaining magnetization in the direction of the band and the current which circulates obliquely in the band, so as to obtain the configuration of maximum sensitivity as in FIG. 3.

A band such as the band 12 can replace the bands 3 (FIG. 4) or 7B, 8B, . . . (FIG. 5) or 10 (FIG. 6), the cores 13 being appropriately oriented taking into account the direction of the poles with respect to the bands 3 or 10 or 7B, 8B, etc.

What is claimed is:

1. A multitrack read head, comprising:
   a plurality of elementary magneto-resistive heads formed as a matrix network;
   wherein each of said magneto-resistive heads includes a magnetic circuit having a first and second pole and a magneto-resistive element inserted into said second pole and wherein said matrix network of said elementary magneto-resistive heads includes a plurality of lines and columns of said elementary magneto-resistive heads in the form of said matrix network;
   means responsive to line selection signals to at least one of said lines of said matrix network for sensitizing the magneto-resistive element of at least one selected head;
   means for collecting read signals generated by said at least one sensitized selected head including means for collecting a totality of signals from each of said columns, wherein in each column of elementary magneto-resistive heads, the magneto-resistive elements form part of a single band of magneto-resistive material.

2. Multitrack read head according to claim 1, wherein the selection signals are sent to conductors isolated from the magnetic circuits of the elementary magneto-resistive heads.

3. Multitrack read head according to claim 1, wherein in each line of elementary magneto-resistive heads, the magnetic circuits of the elementary magneto-resistive heads are electrically connected in series.

4. Multitrack read head according to claim 1 wherein the band of magneto-resistive material includes cores of material of very good electrical conductivity, an axis of said cores being oblique to the perpendicular of an axis of the band.

* * * * *